(12) United States Patent
Krumbein et al.

(10) Patent No.: US 10,525,413 B2
(45) Date of Patent: Jan. 7, 2020

(54) CONNECTING SYSTEM FOR FILTER CASSETTES

(71) Applicant: Sartorius Stedim Biotech GmbH, Goettingen (DE)

(72) Inventors: Thomas Krumbein, Ebergoetzen (DE); Stefan Weisshaar, Adelebsen (DE); Michael Bates, Thrupp/Stroud (GB)

(73) Assignee: Sartorius Stedim Biotech GmbH (DE)

( * ) Notice: Subject to any disclaimer, the term of this patent is extended or adjusted under 35 U.S.C. 154(b) by 578 days.

(21) Appl. No.: 15/035,764

(22) PCT Filed: Oct. 30, 2014

(86) PCT No.: PCT/EP2014/073302
§ 371 (c)(1),
(2) Date: May 11, 2016

(87) PCT Pub. No.: WO2015/067516
PCT Pub. Date: May 14, 2015

(65) Prior Publication Data
US 2016/0288054 A1  Oct. 6, 2016

(30) Foreign Application Priority Data
Nov. 11, 2013 (DE) .......................... 10 2013 112 370

(51) Int. Cl.
*B01D 65/00*  (2006.01)
*B01D 63/08*  (2006.01)
(Continued)

(52) U.S. Cl.
CPC .......... *B01D 63/082* (2013.01); *B01D 65/00* (2013.01); *F16B 5/0642* (2013.01);
(Continued)

(58) Field of Classification Search
None
See application file for complete search history.

(56) References Cited

U.S. PATENT DOCUMENTS

| | | |
|---|---|---|
| 3,494,469 A | 2/1970 | Kohl et al. |
| 3,541,595 A | 11/1970 | Edwards |

(Continued)

FOREIGN PATENT DOCUMENTS

| | | |
|---|---|---|
| DE | 2 028 325 | 12/1970 |
| DE | 1 966 108 | 7/1971 |

(Continued)

OTHER PUBLICATIONS

Translation International Preliminary Report on Patentability and Written Opinion.
International Search Report.

*Primary Examiner* — Hayden Brewster
(74) *Attorney, Agent, or Firm* — Gerald E. Hespos; Michael J. Porco; Matthew T. Hespos

(57) ABSTRACT

A connecting system (1) has at least one connector (2) for a filter cassette (4) that can be inserted into a filter holder and has filter layers (5) between two end plates (6), and seals (7) between the filter layers (5) and/or between the end plates (6) and an adjacent filter layer (5). The connector has tensioning parts that engage in one another in a longitudinally displaceable manner and that can be fixed to the end plates (6) via their ends facing away from one another. The connector exerts a pretensioning force onto the end plates (6) when it is deflected to its maximum extent. The pretensioning force pulls the end plates (6) towards the filter layers (5), and when a contact-pressure force superimposed on the pretensioning force is applied to the end plates (6), the tensioning parts can be pushed towards one another correspondingly with the end plates (6).

10 Claims, 7 Drawing Sheets

(51) Int. Cl.
*F16B 5/06* (2006.01)
*B01J 29/00* (2006.01)
(52) U.S. Cl.
CPC .... *B01D 2313/02* (2013.01); *B01D 2313/025* (2013.01); *F16B 5/065* (2013.01)

(56) References Cited

U.S. PATENT DOCUMENTS

| | | | |
|---|---|---|---|
| 4,196,084 | A | 4/1980 | Schotten |
| 5,192,434 | A | 3/1993 | Moller |
| 6,171,374 | B1 | 1/2001 | Barton et al. |
| 2008/0041795 | A1 | 2/2008 | Thalmann et al. |
| 2008/0135499 | A1 | 6/2008 | Gagnon et al. |
| 2012/0111782 | A1* | 5/2012 | Cirou ............ B01D 61/18 210/227 |
| 2013/0118971 | A1 | 5/2013 | Sayer et al. |
| 2014/0291242 | A1 | 10/2014 | Notzke et al. |

FOREIGN PATENT DOCUMENTS

| | | |
|---|---|---|
| DE | 26 42 357 | 3/1978 |
| DE | 8322594 U1 | 1/1984 |
| DE | 37 08 733 | 10/1987 |
| DE | 10 2005 008 924 | 8/2006 |
| EP | 2 388 061 | 11/2011 |
| WO | 2012/148348 | 11/2012 |
| WO | 2013/013785 | 1/2013 |

* cited by examiner

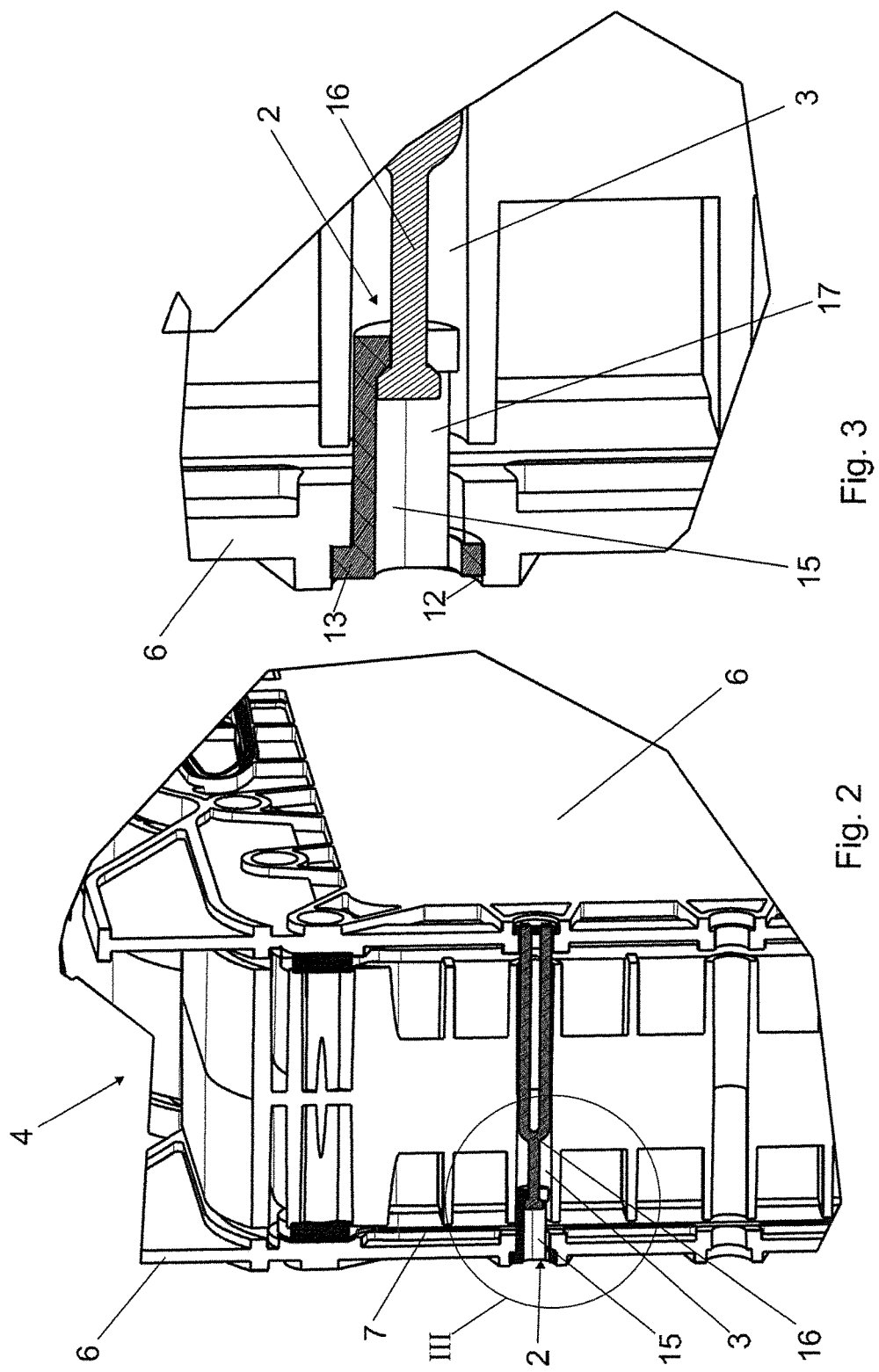

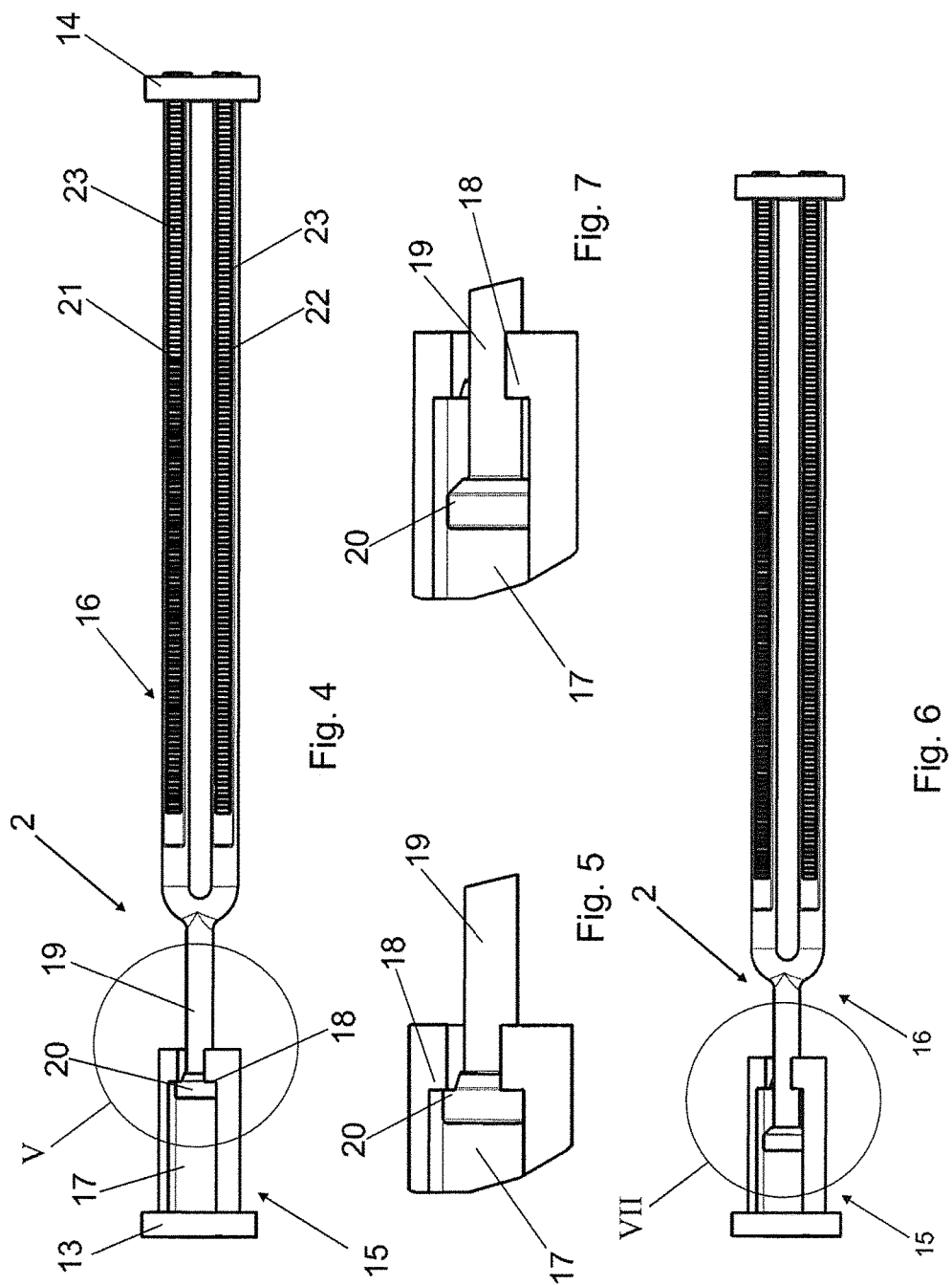

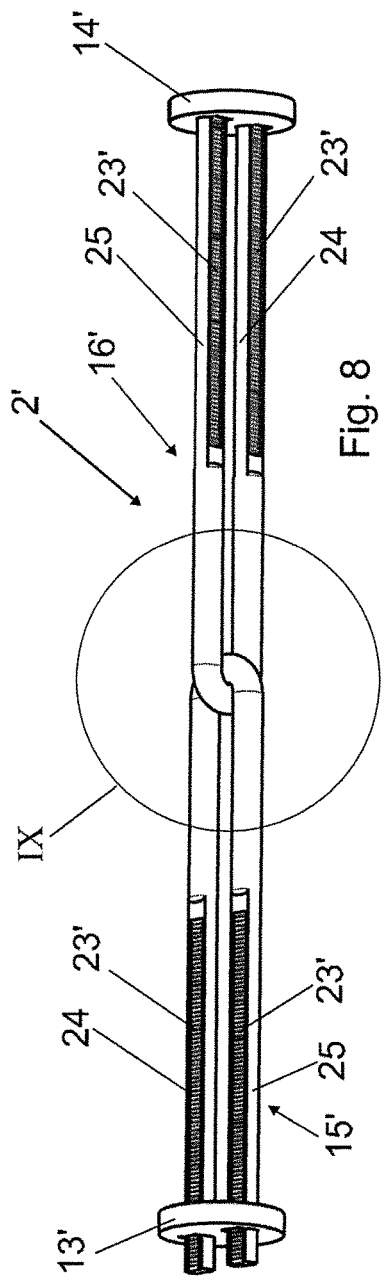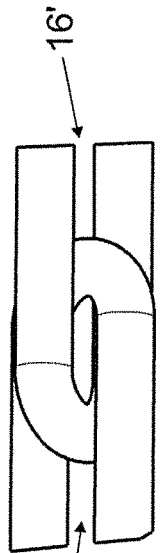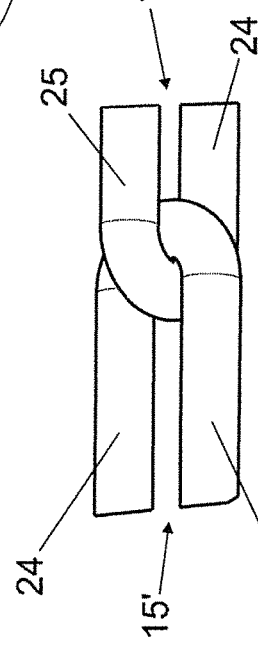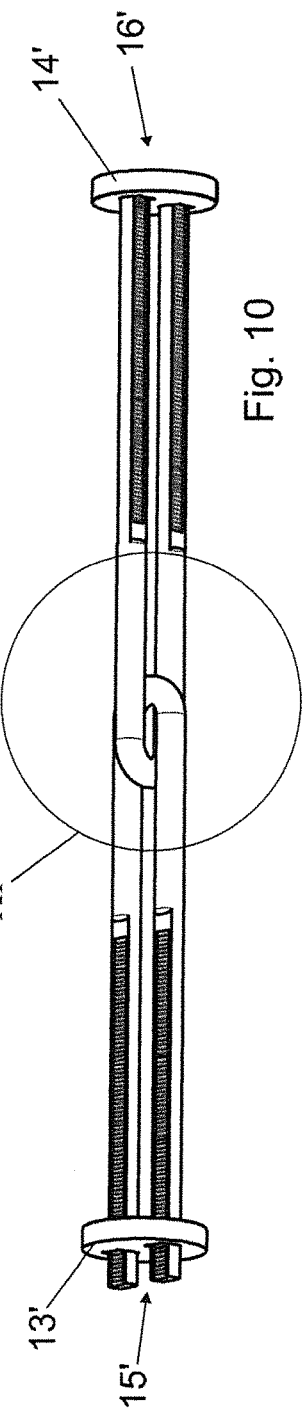

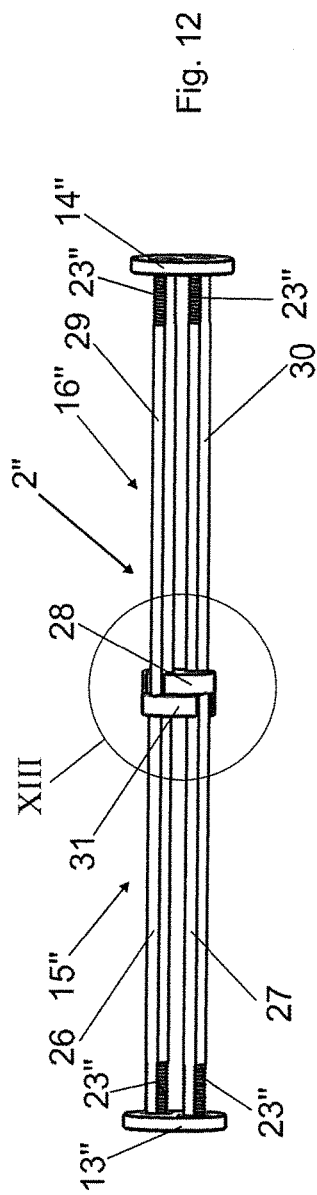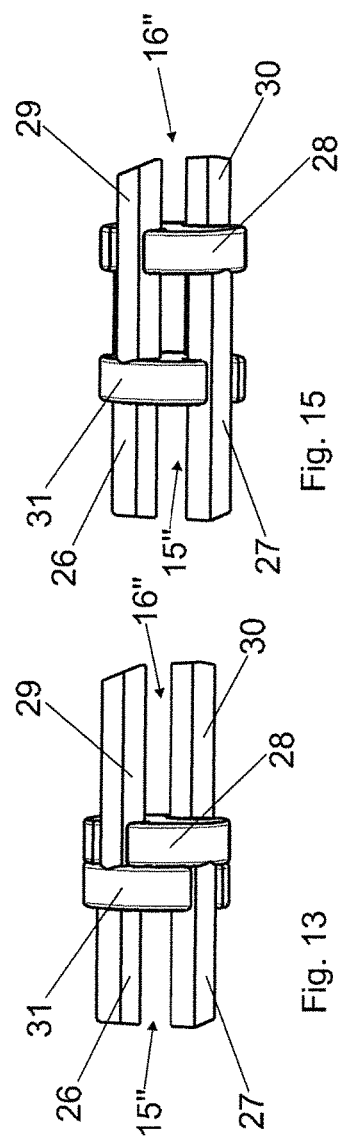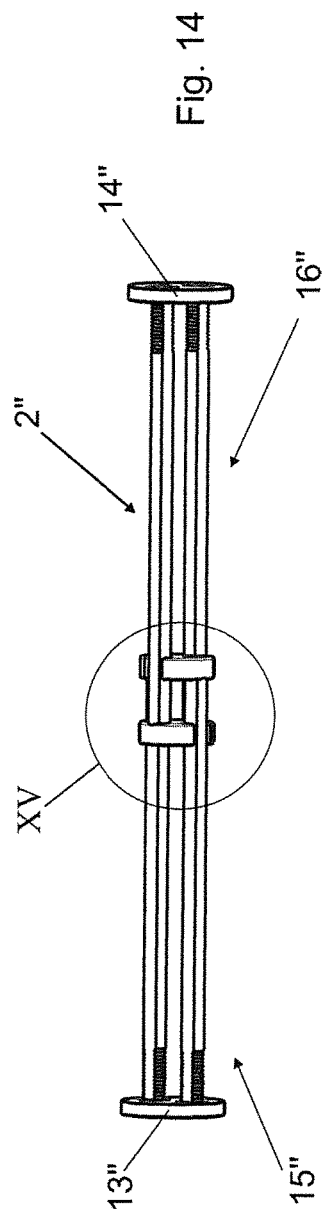

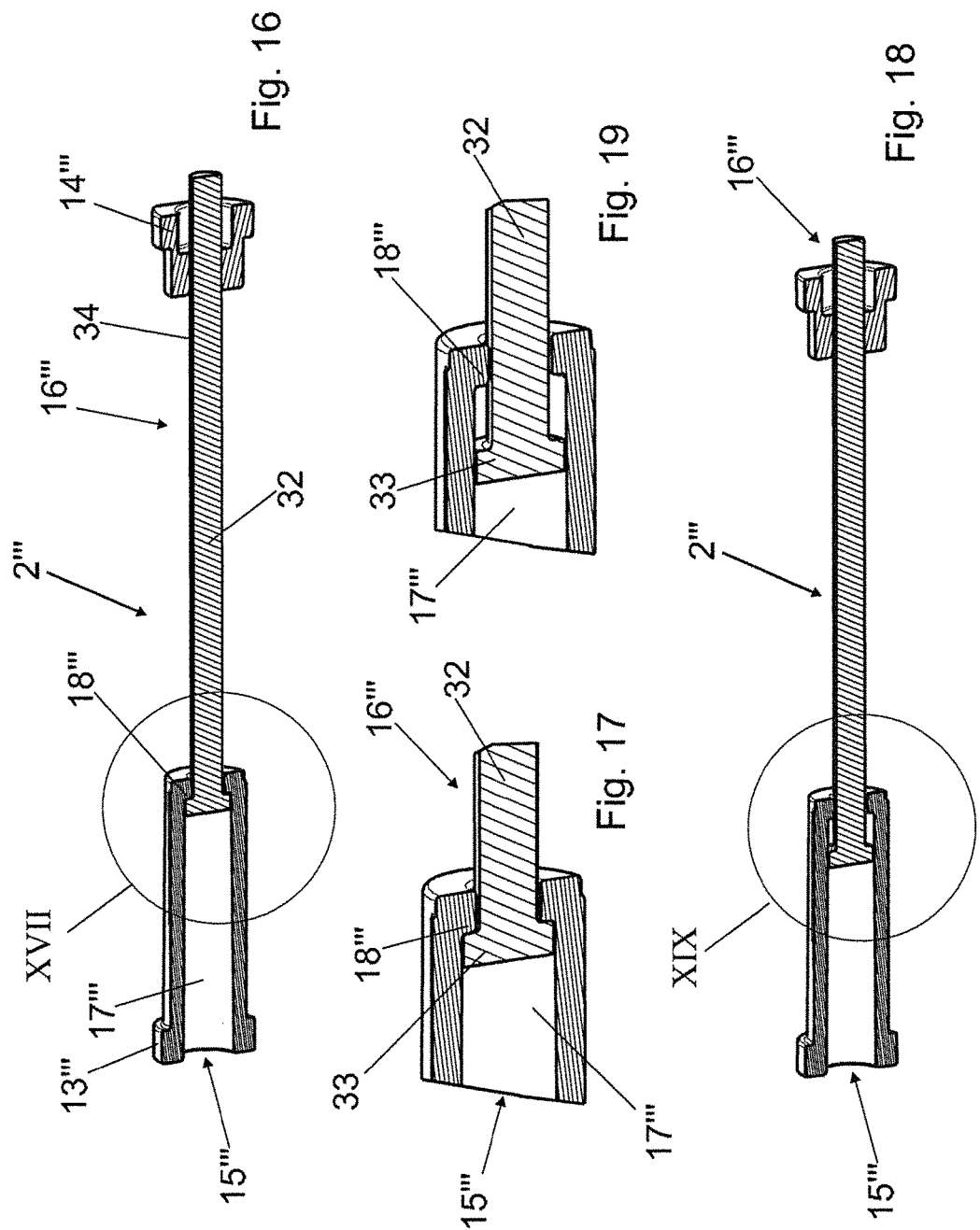

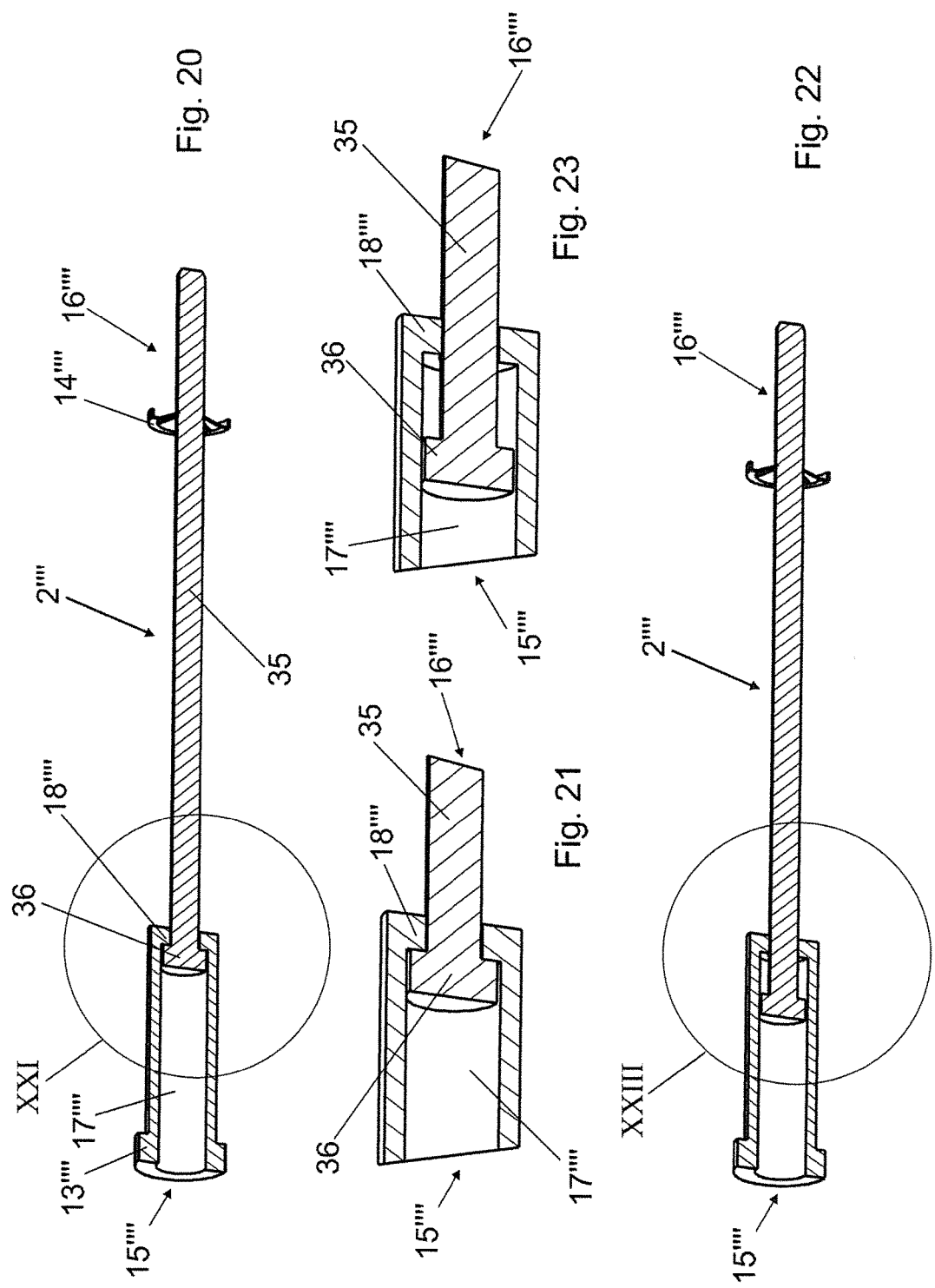

CONNECTING SYSTEM FOR FILTER CASSETTES

BACKGROUND

1. Field of the Invention

The invention relates to a connecting system having at least one connector for a filter cassette that can be inserted into a filter holder and that has one or more filter layers arranged between two end plates, and having seals that are arranged between the filter layers and/or between the end plates and a respectively adjacent filter layer.

The invention further relates to a method for applying a pretensioning force to a filter cassette that can be inserted into a filter holder and that has one or more filter layers arranged between two end plates, and having seals arranged between the filter layers and/or between the end plates and a respectively adjacent filter layer.

2. Related Art

Filter cassettes, such as those used for purification processes using membrane adsorbers or for filtration processes, such as deep-bed filtration, ultra-filtration and micro-filtration, consist of one or more filter layers arranged between two end plates with seals arranged between the filter layers. To perform filtration, the filter cassettes are inserted between two clamping plates into a filter holder, such as is known from DE 37 08 733 C2 or from the company brochure for the "SARTOFLOW® 10 Stainless Steel Holder," and an adjustable contact-pressure force is applied. After the filtration process, the contact-pressure force is removed from the one or more filter cassettes by releasing the clamping plates. This can occasionally result in undesired leakage from the filter cassette, despite the seals arranged between the filter layers.

US 2013/0118971 A1 and DE 2 028 325 A disclose directly applying the contact-pressure force required for filtration, via the end plates of the filter cassette, using appropriate bolts, that are tightened.

One disadvantage of this is the relative difficulty of precisely and reliably adjusting the contact-pressure force in accordance with the requirements of the specific process. Another disadvantage is that these known filter cassettes cannot be inserted into the known filter holders due to their rigid bolt connections.

DE 1 966 108 C3, for example, discloses a latching system for cable ties in which a series of latching teeth is arranged on an elongated, flexible strap. For latching purposes, a head arranged at one end of the strap and having a latching opening and a latching tongue (toothed clamp) matched to the strap is fit latchingly onto the other end of the strap.

An object of the present invention is to improve the known filter cassettes so that, before insertion into a filter holder and after removal from the filter holder, on the one hand, slippage of the individual components is rendered impossible and on the other hand, leakage of medium from the filter cassette is reliably prevented.

A further object of the invention is to improve the known method for applying a contact-pressure force to the filter cassette to prevent the aforementioned disadvantages.

SUMMARY

The invention relates to a connecting system having at least one connector for a filter cassette that can be inserted into a filter holder and having one or more filter layers arranged between two end plates, and having seals arranged between the filter layers and/or between the end plates and a respectively adjacent filter layer. The connector has two tensioning parts that engage in one another in a longitudinally displaceable manner and that can be fixed to the end plates by way of their ends facing away from one another. The connector exerts a pretensioning force onto the end plates when it is deflected to its maximum extent. The pretensioning force pulls the end plates towards one or more filter layers, and, when a contact-pressure force superimposed on the pretensioning force is applied to the end plates, the tensioning parts can be pushed towards one another correspondingly with the end plates.

The fact that the connector essentially comprises two tensioning parts that engage in one another in a longitudinally displaceable manner and that can be fixed to the end plates by way of their ends that are facing away from one another, with the connector exerting a pretensioning force on the end plates when it is deflected to its maximum extent, means that the individual layers of the filter cassette are always pressed against one another with at least the pretensioning force, and therefore sealed. Simultaneously, this prevents potential shifting of the individual layers with respect to one another. Because the tensioning parts of the connector engage in one another in a longitudinally displaceable manner, this additionally enables the application of a contact-pressure force that is superimposed upon the pretensioning force within a filter holder because the tensioning parts are pushed towards one another correspondingly with the motion of the end plates. This reliably prevents damage to the connector. After removal of the filter cassette from the filter holder, the pretensioning force continues to be exerted on the filter cassette, and this reliably prevents leakage of medium from the filter cassette. Furthermore, a plurality of filter cassettes can be clamped in the filter holder.

Another advantage of the connectors is that the seals within the filter cassette only are exposed to stress while the filter cassette is in use and are not exposed to continuous stress. Consequently, this also allows the use of low-cost seal materials, such as thermoplastics. The seals within the filter cassette are arranged both between the filter layer and the end plates as well as—in the case of multiple filter layers—between the respective filter layers. In the case of multiple filter layers, so-called spacing holder plates can be provided against which the filter layers also are sealed by means of seals. In this case, the seals form a sort of frame around the respective layers or are arranged separately along the periphery of the layers.

In contrast to the filter units known from the prior art, which are overmoulded in sealing material, the connectors allow for easy and flexible compensation of manufacturing tolerances.

The filter cassette of one embodiment has at least one through-channel to accommodate the at least one connector, and the through-channel in the end plates in each case transitions into an offset to accommodate fasteners on the end of the connector. If only one through-channel is provided, it should be arranged centrally to distribute the contact-pressure force as evenly as possible.

According to another embodiment, in the edge areas of the end plates, the filter cassette has a plurality of through-channels running orthogonally to the end plates, to accommodate in each case one connector. Even distribution of the contact-pressure force is ensured by arranging a plurality of through-channels with corresponding connectors.

The first tensioning part may be designed as a receiving bushing with a lateral opening whose end facing the second tensioning part has a constriction forming a stop, and whose end facing away from the second tensioning part transitions into a disc-shaped fastener. The second tensioning part can be shaped like a tuning fork and have a gripping rod on whose free end facing toward the first tensioning part a stop is arranged. The free end can be inserted laterally into the receiving bushing of the first tensioning part, and the end of the gripping rod facing away from the first tensioning part transitions into two parallel fork ends. A fastener designed as a lock washer may be provided and may have latching openings with latching tongues matched to the fork ends. The latching openings can be fit latchingly on the fork ends that have laterally arranged latching teeth. The fork ends and the fastener thus form a latching connection, such as is known to a person skilled in the art in the field of cable ties. In the connector's maximum position, a stop disc of a cylindrically shaped gripping rod abuts on the constriction of the receiving bushing that forms a stop, so that between the fasteners of the connector a pretensioning force is exerted on the end plates.

The first tensioning part has two parallel fork ends that transition into one another in a U-shape at the end facing the second tensioning part. The fork ends have laterally arranged latching teeth. A fastener designed as a lock washer having latching openings with latching tongues matched to the fork ends can be fit latchingly onto the fork ends. Similarly, the second tensioning part also has two parallel fork ends that transition into one another in a U-shape at the end facing the first tensioning part. The fork ends have laterally arranged latching teeth, and a fastener designed as a lock washer having latching openings with latching tongues matched to the fork ends can be fit latchingly onto the fork ends. The U-shaped facing ends of the first tensioning part and of the second tensioning part engage in one another in the manner of a chain link. This embodiment has the advantage that the first tensioning part and the second tensioning part can be identical in design.

The first tensioning part may have two parallel guide rods that are connected to one another by a connector part at the end facing the second tensioning part. In this case also, the guide rods have laterally arranged latching teeth, and a fastener designed as a lock washer having latching openings with latching tongues that are matched to the guide rods can be fit latchingly onto the guide rods. The second tensioning part also has two parallel guide rods which at the end facing the first tensioning part are connected to one another by a connector part at the end facing the first tensioning part. The guide rods have laterally arranged latching teeth, and a fastener designed as a lock washer having latching openings with latching tongues matched to the fork ends can be fit latchingly onto the fork ends. The first tensioning part and the second tensioning part engage in one another via their facing ends.

This embodiment also has the advantage that the first tensioning part and the second tensioning part can be identical in design. In addition, each tensioning part comprises two identical guide rods. Furthermore, the embodiment is more stable and easier to install.

According to another embodiment, the first tensioning part is designed as a receiving bushing whose end facing the second tensioning part has a constriction forming a stop and whose end facing away from the second tensioning part transitions into a ring-shaped fastener. The second tensioning part can be designed as a guide rod, and a stop disc may be arranged on the end facing the first tensioning part. The end of the guide rod facing away from the stop disc may have a thread, and the second tensioning part can be inserted into the first tensioning part. The stop of the second tensioning part can be abutted against the stop formed by the constriction in the first tensioning part, and a threaded sleeve designed as a fastener can be screwed onto the threaded end of the guide rod.

According to another embodiment, the thread can be dispensed with on the free end of the second tensioning part facing away from the stop disc if the fastener is designed as a spring lock washer that can be fit easily onto the free end of the guide rod.

The invention also relates to a method for applying a pretensioning force to a filter cassette that can be inserted into a filter holder and having one or more filter layers arranged between two end plates, and having seals arranged between the filter layers and/or between the end plates and a respectively adjacent filter layer. The method includes the following steps:

a) Partially installing a connector by inserting into one another two tensioning parts that engage in one another in a longitudinally displaceable manner, b) Inserting the connector into a through-channel arranged orthogonally with respect to the end plates of the filter cassette, with the first tensioning part with its end-positioned fastener being placed into a first offset of the through-channel in the first end plate and with the free end of the second tensioning part projecting from the second offset of the through-channel, with the second offset being arranged in the second end plate, c) Fitting or screwing the fastener at the end of the second tensioning part onto the free end of the second tensioning part while applying the desired pretensioning force.

Inserting and fastening the connectors in the through-channels is a relatively easy and cost-effective way to continuously apply a pretensioning force on the filter cassettes. The longitudinal displaceability of the two tensioning parts of each connector allows the connector to give way appropriately when pressure is applied, without being bent or destroyed. When a filter cassette is clamped into a filter holder, it is easy to superimpose onto the pretensioning force the contact-pressure force that is necessary for filtration. When the filter cassette is removed from the filter holder, the pretensioning force then acts again on the filter cassette. The pretensioning force is reliably maintained so that the filter cassette remains reliably sealed even outside of the filter holder, without the contact-pressure force exerted by the holder.

During installation of the connectors, steps a) to c) can be repeated according to the number of connectors.

According to one embodiment of the invention, the filter cassette is inserted between two clamping plates of the filter holder and a contact-pressure force superimposed on the pretensioning force is applied to the end plates, with the tensioning parts being pushed toward one another correspondingly together with the movement of the end plates.

Additional features and advantages of the invention are evident from the following specific description and the drawings.

BRIEF DESCRIPTION OF THE DRAWINGS

FIG. 2 is an enlarged view of detail II from FIG. 1.

FIG. 3 is an enlarged view of detail III from FIG. 2.

FIG. 4 is an enlarged lateral view of the connector from FIG. 1 with a second tensioning part having the shape of a tuning fork.

FIG. 5 is an enlarged view of detail V of the connector from FIG. 4.

FIG. 6 is a lateral view of the connector from FIG. 4 in a position with superimposed contact-pressure force.

FIG. 7 is an enlarged view of detail VII of FIG. 6.

FIG. 8 is an enlarged lateral view of a further connector in which the first tensioning part has two parallel fork ends which, at the end facing the second tensioning part, transition into one another in a U-shaped manner, with the second tensioning part being designed to correspond to the first tensioning part.

FIG. 9 is an enlarged view of detail IX from FIG. 8.

FIG. 10 is a lateral view of the connector from FIG. 8 in a position with superimposed contact-pressure force.

FIG. 11 is an enlarged lateral view of detail XI from FIG. 10.

FIG. 12 is an enlarged lateral view of a further connector in which the first tensioning part has two parallel fork ends which at the end facing the second tensioning part are connected to one another by means of a connector part.

FIG. 13 is an enlarged view of detail XIII from FIG. 12.

FIG. 14 is a lateral view of the connector from FIG. 12 in a position with superimposed contact-pressure force.

FIG. 15 is an enlarged view of detail XV from FIG. 14.

FIG. 16 is an enlarged lateral cross-sectional view of a further connector in which the first tensioning part is designed as a receiving bushing and the second tensioning part is designed as a threaded guide rod.

FIG. 17 is an enlarged view of detail XVII from FIG. 16.

FIG. 18 is a lateral cross-sectional view of the connector from FIG. 16 in a position with superimposed contact-pressure force.

FIG. 19 is an enlarged view of detail XIX from FIG. 18.

FIG. 20 is a lateral cross-sectional view of a further connector in which the first tensioning part is designed as a receiving bushing and the second tensioning part is designed as a guide rod, onto the free end of which a spring lock washer has been placed as a fastener.

FIG. 21 is an enlarged view of detail XXI from FIG. 20.

FIG. 22 is a lateral view of the connector from FIG. 20 in a position with superimposed contact-pressure force.

FIG. 23 is an enlarged view of detail XXIII from FIG. 22.

DETAILED DESCRIPTION

Figure 1:
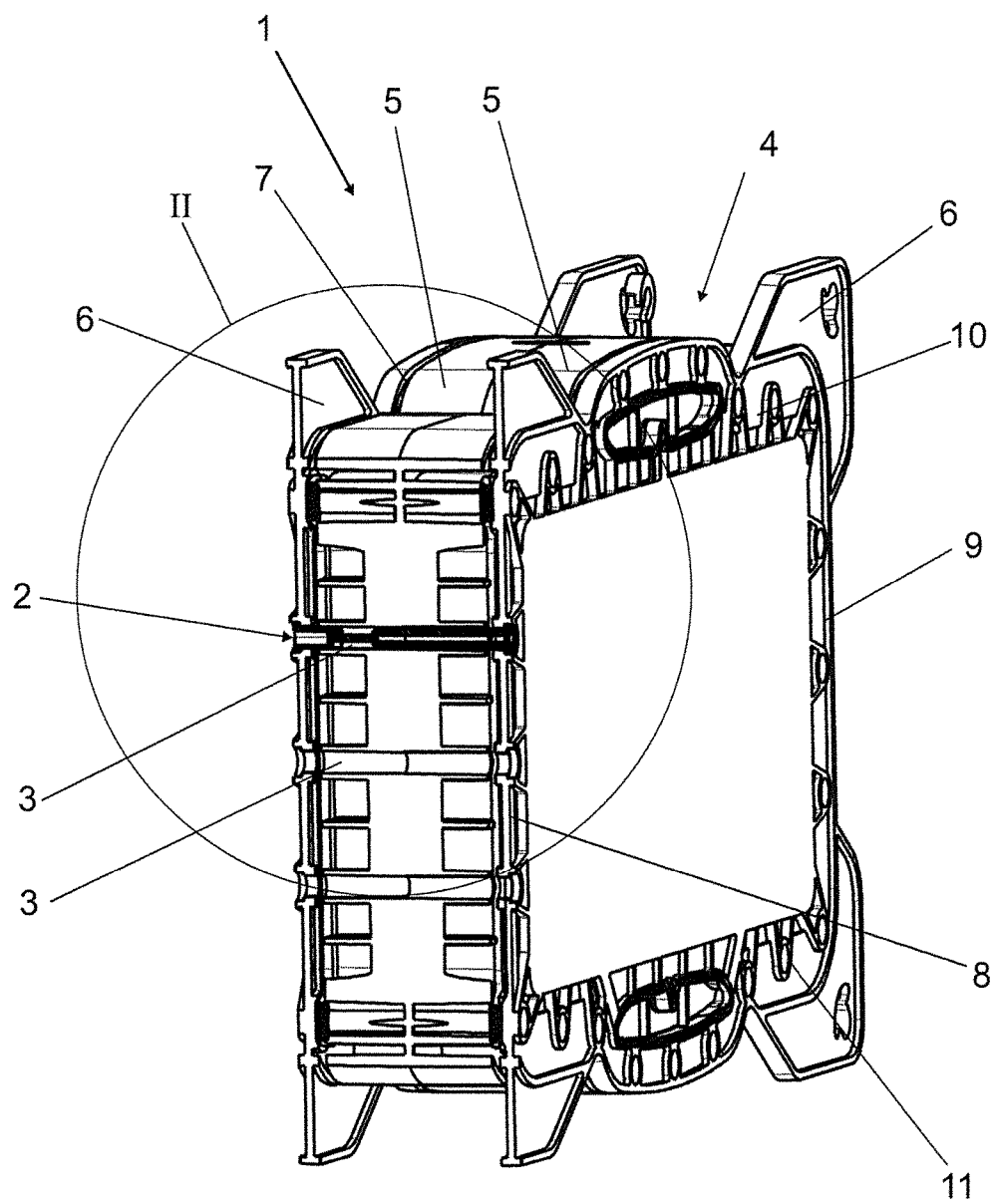
FIG. 1 is a three-dimensional view of a filter cassette with inserted connector with a front lateral edge shown in cross-section.

A connecting system 1 essentially comprises a plurality of connectors 2 in through-channels 3 of filter cassettes 4.

The filter cassette 4 comprises multiple filter layers 5 arranged between two end plates 6. In each case, seals 7 are arranged between the filter layers 5 and the end plates 6. The through-channels 3, which accommodate the connectors 2, run orthogonally to the end plates 6, and terminate in the edge areas of the end plates 6. The through-channels 3 transition in each case into an offset 12 in the end plates 6 to accommodate end-positioned fasteners 13, 14.

According to the exemplary embodiment in FIGS. 4 to 6, the connector 2 comprises a first tensioning part 15 and a second tensioning part 16 which engage in one another in a longitudinally displaceable manner. The first tensioning part 15 is designed as a receiving bushing 17 with a lateral opening. At its end which faces the second tensioning part 16, the receiving bushing 17 has a constriction forming a stop 18. The end of the receiving bushing that faces away from the second tensioning part 16 has the first fastener 13, with which the receiving bushing can be inserted into the offset 12 of the through-channel 3 of the end plate 6.

The second tensioning part 16 of the connector 2 is designed in the shape of a tuning fork and has a gripping rod 19 on whose free end facing the first tensioning part 15 a stop 20 is arranged. The free end of the gripping rod 19 can be inserted laterally into the receiving bushing 17 of the first tensioning part 15 so that in a maximum position, in which a pretensioning force can be applied to the end plates 6, the stop 20 of the gripping rod 19 can abut the stop 18 of the receiving bushing 17. At the end facing away from the first tensioning part 15 the gripping rod 19 transitions into two parallel fork ends 21, 22. The fork ends 21, 22 have laterally arranged latching teeth 23. The fastener 14 is designed as a lock washer having latching openings with latching tongues (not shown) matched to the fork ends 21, 22, said washer can be latchingly fitted onto the fork ends 21, 22 and it engages in the offset 12 of the through-channel 3 of the end plate 6.

According to the exemplary embodiment of FIGS. 8 to 11, the first tensioning part 15' of the connector 2' has two parallel fork ends 24, 25 whose ends facing the second tensioning part 16' transition into one another in a U-shape, and the fork ends 24, 25 have laterally arranged latching teeth 23'. The fastener 13', which corresponds to the fastener 14, and has latching openings and latching tongues (also not shown) matched to the fork ends 24, 25, can be latchingly fitted onto the fork ends 24, 25. The second tensioning part 16' of the connector 2' with its fastener 14' corresponds in design to the first tensioning part 15'. The U-shaped facing ends of the first tensioning part 15' and of the second tensioning part 16' engage in one another in the manner of chain links.

According to the exemplary embodiment in FIGS. 12 to 15, the first tensioning part 15" of the connector 2" has two parallel guide rods 26, 27 whose ends facing toward the second tensioning part 16" are connected to one another by means of a connector part 28. The guide rods 26, 27 have laterally arranged latching teeth 23" and are identical in design. A fastener 13" designed as a lock washer, with latching openings having latching tongues (not shown) matched to the guide rods 26, 27, can be latchingly fitted onto the guide rods 26, 27

Like the first tensioning part 15", the second tensioning part 16" also has parallel guide rods 29, 30 that correspond to the guide rods 26, 27 and are connected to one another by means of a connector part 31 that corresponds to the connector part 28. The fastener 14" therefore corresponds to the fastener 13" of the first tensioning part 15".

According to the exemplary embodiment from FIGS. 16 to 19, the first tensioning part 15''' of the connector 2''' is designed as a receiving bushing 17''' whose end facing the second tensioning part 16''' has a constriction forming a stop 18''' and whose end facing away from the second tensioning part 16''' transitions into a ring-shaped fastener 13'''. The second tensioning part 16''' is designed as a guide rod 32 on whose end facing the first tensioning part 15''' a stop 33 is arranged, and the second tensioning part 16''' can be inserted into the first tensioning part 15''', and the stop 33 of the second tensioning part 16''' can abut the stop 18''' formed by the constriction in the first tensioning part 15'''. The guide rod 32 of the second tensioning part 16''' has a thread 34 on its end facing away from the first tensioning part 15'''. The fastener 14''' of the second tensioning part 16''' is designed as a threaded sleeve that can be screwed onto the threaded end of the guide rod 32.

According to the exemplary embodiment from FIGS. 20 to 23, the connector 2'''' comprises a first tensioning part 15'''' designed as a receiving bushing 17'''' with a stop 18'''' and a fastener 13''''. The second tensioning part 16'''' is designed as a guide rod 35 whose end facing the first tensioning part 15'''' has a stop 36 that can abut the stop 18'''' formed by the constriction in the first tensioning part 15''''. A spring lock washer designed as a fastener 14'''' can be fitted onto the free end of the guide rod 35 facing away from the first tensioning part 15''''. The spring-action, curved shape of the fastener 14'''' means that the lock washer can only be displaced in one direction, namely toward the first tensioning part 15''''.

To apply a pretensioning force to a filter cassette 4 that is insertable into a filter holder (not shown) (see, for example, the company brochure "SARTOFLOW® 10 Stainless Steel Holder"), the connector 2, 2', 2'', 2''', 2'''' is first partially installed by inserting into one another its longitudinally displaceable tensioning parts 15, 16; 15', 16'; 15'', 16''; 15''', 16'''; 15'''', 16'''' that engage in one another.

After insertion of the connector 2, 2', 2'', 2''', 2'''' into its assigned through-channel, the first tensioning part 15, 15', 15'', 15''', 15'''' is inserted with its end-positioned fastener 13, 13', 13'', 13''', 13'''' into the first offset 12 of the through-channel 3. Next, the end-positioned fastener 14, 14', 14'', 14''', 14'''' of the second tensioning part 16, 16', 16'', 16''', 16'''' is fitted or screwed onto the free end of the second tensioning part whilst applying the desired pretensioning force.

Of course, the embodiments discussed in the specific description and shown in the Figures are merely illustrative exemplary embodiments of the present invention. In light of the present disclosure, a person skilled in the art is given a wide range of possible variations.

LIST OF REFERENCE NUMBERS

1 Connecting system
2, 2', 2'', 2''', 2'''' Connector
3 Through-channel of 4
4 Filter cassette
5 Filter layer
6 End plate
7 Seal
8 Edge area of 6
9 Edge area of 6
10 Edge area of 6
11 Edge area of 6
12 Offset of 3
13, 13', 13'', 13''', 13'''' Fastener
14, 14', 14'', 14''', 14'''' Fastener
15, 15', 15'', 15''', 15'''' First tensioning part
16, 16', 16'', 16''', 16'''' Second tensioning part
17, 17''' Receiving bushing
18, 18''', 18'''' Stop
19 Gripping rod of 16
20 Stop of 19
21 Fork end
22 Fork end
23, 23', 23'' Latching tooth
24 Fork end
25 Fork end
26 Guide rod of 15''
27 Guide rod of 15''
28 Connector part of 15''
29 Guide rod of 16''
30 Guide rod of 16''
31 Connector part of 16''
32 Guide rod of 16'''
33 Stop of 32
34 Thread of 32
35 Guide rod of 16''''
36 Stop

The invention claimed is:

1. A connecting system, comprising:
a filter cassette having one or more filter layers arranged between two end plates, and having seals arranged between the filter layers and/or between the end plates and a respectively adjacent filter layer;
at least one connector having first and second tensioning parts, the first and second tensioning parts having inner ends that are engaged with one another in a longitudinally displaceable manner, the first and second tensioning parts further having outer ends that are opposite the respective inner ends and that are configured to be fixed to the end plates, the first tensioning part defining a receiving bushing with a lateral opening between the inner and outer ends, the inner end of the first tensioning part having an axial opening with a constriction, and the outer end of the first tensioning part defining a disc-shaped fastener, the second tensioning part defining a gripping rod movably engaged in the axial opening of the first tensioning part, the inner end of the second tensioning part forming a stop engageable with the constriction of the first tensioning part, latching teeth extending from the outer end of the second tensioning part toward the gripping rod, and a lock washer having at least one latch opening with at least one latching tongue configured to be fit to the latching teeth;
the at least one connector being configured to exert a pretensioning force onto the end plates when the connector is deflected, said pretensioning force pulling the end plates towards the filter layers, and
the tensioning parts being configured so that when a contact-pressure force that is superimposed on the pretensioning force is applied to the end plates, the tensioning parts can be pushed towards one another correspondingly with the end plates.

2. The connecting system of claim 1, wherein:
the filter cassette has at least one through-channel for accommodating the at least one connector, and
each of the through-channels in the end plates transitions into an offset to accommodate the outer end of the respective tensioning part of the connector.

3. The connecting system of claim 1, wherein:
the second tensioning part is in the shape of a tuning fork with two parallel fork ends extending from the outer end of the second tensioning part toward the gripping rod, each of the parallel fork ends having the latching teeth.

4. A connecting system, comprising:
a filter cassette having one or more filter layers arranged between two end plates, and having seals arranged between the filter layers and/or between the end plates and a respectively adjacent filter layer;
at least one connector having first and second tensioning parts, the first and second tensioning parts having inner ends that are engaged with one another in a longitudinally displaceable manner, the first and second tensioning parts further having outer ends that are opposite the respective inner ends and that are configured to be fixed to the end plates, the first tensioning part having two parallel first fork ends that extend from the outer end of the first tensioning part toward the inner end thereof and that transition into one another in a U-shape at the inner end of the first tensioning part, the first fork ends have laterally arranged first latching teeth, and
a first fastener having first latching openings with first latching tongues matched to the first fork ends, the first latching tongues being configured to be fit and latched onto the first fork ends;
the at least one connector being configured to exert a pretensioning force onto the end plates when the connector is deflected, said pretensioning force pulling the end plates towards the filter layers, and
the tensioning parts being configured so that when a contact-pressure force that is superimposed on the pretensioning force is applied to the end plates, the tensioning parts can be pushed towards one another correspondingly with the end plates.

5. The connecting system of claim 4, wherein:
the second tensioning part has two parallel second fork ends that extend from the outer end of the second tensioning part toward the inner end thereof and that transition into one another in a U-shape at the inner end of the second tensioning part,
the second fork ends have laterally arranged second latching teeth, and
a second fastener having second latching openings with second latching tongues matched to the second fork ends, the second latching tongues being configured to be fit and latched onto the second fork ends and the U-shaped inner ends of the first tensioning part and of the second tensioning part engage one another in the manner of a chain link.

6. A connecting system, comprising:
a filter cassette having one or more filter layers arranged between two end plates, and having seals arranged between the filter layers and/or between the end plates and a respectively adjacent filter layer;
at least one connector having first and second tensioning parts, the first and second tensioning parts having inner ends that are engaged with one another in a longitudinally displaceable manner, the first and second tensioning parts further having outer ends that are opposite the respective inner ends and that are configured to be fixed to the end plates, the first tensioning part has two parallel first guide rods that are connected to one another by a first connector part at the inner end of the first tensioning part,
the first guide rods have laterally arranged first latching teeth, and
a first fastener having first latching openings with first latching tongues matched to the first guide rods, the first latching tongues being configured to be fit and latched onto the first guide rods
the at least one connector being configured to exert a pretensioning force onto the end plates when the connector is deflected, said pretensioning force pulling the end plates towards the filter layers, and
the tensioning parts being configured so that when a contact-pressure force that is superimposed on the pretensioning force is applied to the end plates, the tensioning parts can be pushed towards one another correspondingly with the end plates.

7. The connecting system of claim 6, wherein:
the second tensioning part has two parallel second guide rods and a second connector part connecting ends of the second guide rods at the inner end of the second tensioning part, the second guide rods have laterally arranged second latching teeth,
a second fastener having second latching openings with second latching tongues matched to the second guide rods and being fit and latched onto the second guide rods, and
the inner ends of the first tensioning part and the second tensioning part engage with one another.

8. A connector system, comprising:
a filter cassette having one or more filter layers arranged between two end plates, and having seals arranged between the filter layers and/or between the end plates and a respectively adjacent filter layer;
at least one connector having first and second tensioning parts, the first and second tensioning parts having inner ends that are engaged with one another in a longitudinally displaceable manner, the first and second tensioning parts further having outer ends that are opposite the respective inner ends and that are configured to be engaged with the end plates, wherein:
the first tensioning part defines a receiving bushing, the inner end of the first tensioning part defines a constriction forming a stop and the outer end of the first tensioning part transitions into a ring-shaped fastener,
the second tensioning part is a guide rod, the inner end of the second tensioning part defines a stop,
the second tensioning part having a thread extending from the outer end toward the stop,
the second tensioning part is configured to be inserted into the first tensioning part,
the stop of the second tensioning part is configured and disposed to abut the stop formed by the constriction in the first tensioning part, and
a threaded sleeve fastener screwed onto the thread extending from the outer end of the second tensioning part and being threaded toward the inner end of the second tensioning part to exert a pretensioning force onto the end plates when the connector is deflected, said pretensioning force pulling the end plates towards the filter layers, and
the tensioning parts being configured so that when a contact-pressure force that is superimposed on the pretensioning force is applied to the end plates, the tensioning parts can be pushed towards one another correspondingly with the end plates.

9. A connecting system, comprising:
a filter cassette having one or more filter layers arranged between two end plates, and having seals arranged between the filter layers and/or between the end plates and a respectively adjacent filter layer;
at least one connector having first and second tensioning parts, the first and second tensioning parts having inner ends that are engaged with one another in a longitudinally displaceable manner, the first and second tensioning parts further having outer ends that are opposite the respective inner ends and that are configured to be engaged with the end plates, wherein:
the first tensioning part defining a receiving bushing, the inner end of the first tensioning part defines a constriction forming a stop and the outer end of the first tensioning part transitions into a ring-shaped fastener,
the second tensioning part is a guide rod the inner end of the second tensioning part defines a stop,
the second tensioning part is configured to be inserted into the first tensioning part, the stop of the second tensioning part is configured and disposed to abut the stop formed by the constriction in the first tensioning part, and a spring lock washer fastener fit onto the outer end of the second tensioning part and locked at a selected position between the inner and outer ends of the second tensioning part for exerting a pretensioning force onto the end plates when the connector is deflected, said pretensioning force pulling the end plates towards the filter layers, and the tensioning parts being configured so that when a contact-pressure force that is superimposed on the pretensioning force is applied to the end plates, the tensioning parts can be pushed towards one another correspondingly with the end plates.

10. The connector system of claim 1, wherein:

the at least one connector comprises plural connectors, and edge areas of the end plates of the filter cassette have plural through-channels running orthogonally to the end plates, each of the through channels accommodating one of the connectors.

\* \* \* \* \*